United States Patent
Koreeda et al.

(10) Patent No.: US 8,033,740 B2
(45) Date of Patent: Oct. 11, 2011

(54) OPTICAL CONNECTOR HAVING AN INTERNAL CLEARANCE AT A PART TO BE CONNECTED TO AN OPTICAL FIBER

(75) Inventors: Yuichi Koreeda, Tokyo (JP); Hisaya Takahashi, Tokyo (JP); Mikio Oda, Tokyo (JP); Hideyuki Ono, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/592,355

(22) Filed: Nov. 24, 2009

(65) Prior Publication Data

US 2010/0158450 A1 Jun. 24, 2010

(30) Foreign Application Priority Data

Dec. 22, 2008 (JP) .................................. 2008-325567

(51) Int. Cl.
*G02B 6/36* (2006.01)
(52) U.S. Cl. ................. 385/65; 385/83; 385/87
(58) Field of Classification Search .................... 385/83, 385/87, 65
See application file for complete search history.

(56) References Cited

U.S. PATENT DOCUMENTS 7,052,187 B2 * 5/2006 Ohtsuka et al. .................. 385/60

FOREIGN PATENT DOCUMENTS

JP 10-123368 5/1998
JP 3939689 3/2005

OTHER PUBLICATIONS

Machine translation of publication JP10123368 (May 1998).*

* cited by examiner

*Primary Examiner* — Jerry Rahll
(74) *Attorney, Agent, or Firm* — Collard & Roe, P.C.

(57) ABSTRACT

In an optical connector including a base housing, a cover housing, and a clamp fixing the cover housing to the base housing, the base housing is provided with a groove for positioning and holding an optical fiber of an optical cable, a first recessed portion continuously formed from the groove, and a second recessed portion continuously formed from the first recessed portion. The first and the second recessed portions have bottom portions different in level from each other to have a stepped portion formed therebetween. The cover housing has a first coating portion for covering the groove and a second coating portion for covering the first and the second recessed portions. The bottom portion of the second recessed portion and the second coating portion presses a coating member of the optical cable to clamp the optical cable.

7 Claims, 3 Drawing Sheets

OPTICAL CONNECTOR HAVING AN INTERNAL CLEARANCE AT A PART TO BE CONNECTED TO AN OPTICAL FIBER

This application is based upon and claims the benefit of priority from Japanese Patent Application No. 2008-325567, filed on Dec. 22, 2008, the disclosure of which is incorporated herein in its entirety by reference.

TECHNICAL FIELD

The present invention relates to an optical connector to be connected to an optical cable having an optical fiber covered with a coating member.

BACKGROUND ART

JP-A-H10-123368 (Patent Document 1) discloses one example of an optical connector. The optical connector comprises a ferrule body and a clamp. The ferrule body has a guide pin hole, a fiber hole, and a fiber chamber. An upper wall of each of the fiber hole and the fiber chamber is partly removed to form a clamp window. The clamp is divided into two parts, that is, a core clamp and a coating clamp. The core clamp and the coating clamp are fitted to the clamp window of the ferrule body. Under a spring force, an optical fiber of an optical cable and a coating portion of the optical cable are clamped by the core clamp and the coating clamp, respectively.

JP-B-3939689 (Patent Document 2) discloses another example of the optical connector. The optical connector comprises a housing, an outer frame formed inside the housing, and an inner frame formed inside the outer frame. The inner frame has an exposed portion provided with a V-shaped groove. In the V-shaped groove, an optical fiber of an optical cable is disposed in a deeply sunken state. Thus, the optical fiber of the optical cable is not held in press contact but merely supported.

SUMMARY OF THE INVENTION

In the optical connector disclosed in Patent Document 1, the optical fiber of the optical cable is pressed under the spring force via the core clamp. Accordingly, an optical performance of the optical cable may be impaired.

In the optical connector disclosed in Patent Document 2, the optical fiber of the optical cable is disposed in the V-shaped groove in a deeply sunken state. Thus, the optical fiber is not held in press contact but merely supported. Therefore, the optical performance of the optical cable may be impaired by a local bending stress caused in the optical fiber.

It is therefore an exemplary object of the present invention to provide an optical connector which is capable of maintaining a holding strength for holding an optical cable without impairing an optical performance of the optical cable.

Other objects of the present invention will become clear as the description proceeds.

According to an exemplary aspect of the present invention, there is provided an optical connector adapted to be connected to an optical cable having an optical fiber and a coating member covering the optical fiber. The optical connector comprising a base housing, a cover housing; and a clamp fixing the cover housing to the base housing, wherein the base housing comprises a groove for positioning and holding the optical fiber of the optical cable, a first recessed portion continuously formed from the groove, and a second recessed portion continuously formed from the first recessed portion, wherein the first and the second recessed portions comprises bottom portions different in level from each other to have a stepped portion formed therebetween, wherein the cover housing comprises a first coating portion for covering the groove and a second coating portion for covering the first and the second recessed portions, and wherein the bottom portion of the second recessed portion and the second coating portion presses the coating member of the optical cable to clamp the optical cable.

DESCRIPTION OF THE EXEMPLARY EMBODIMENT

Referring to FIGS. 1 to 4, description will be made about an optical connector according to an exemplary embodiment of the present invention.

Figure 1:
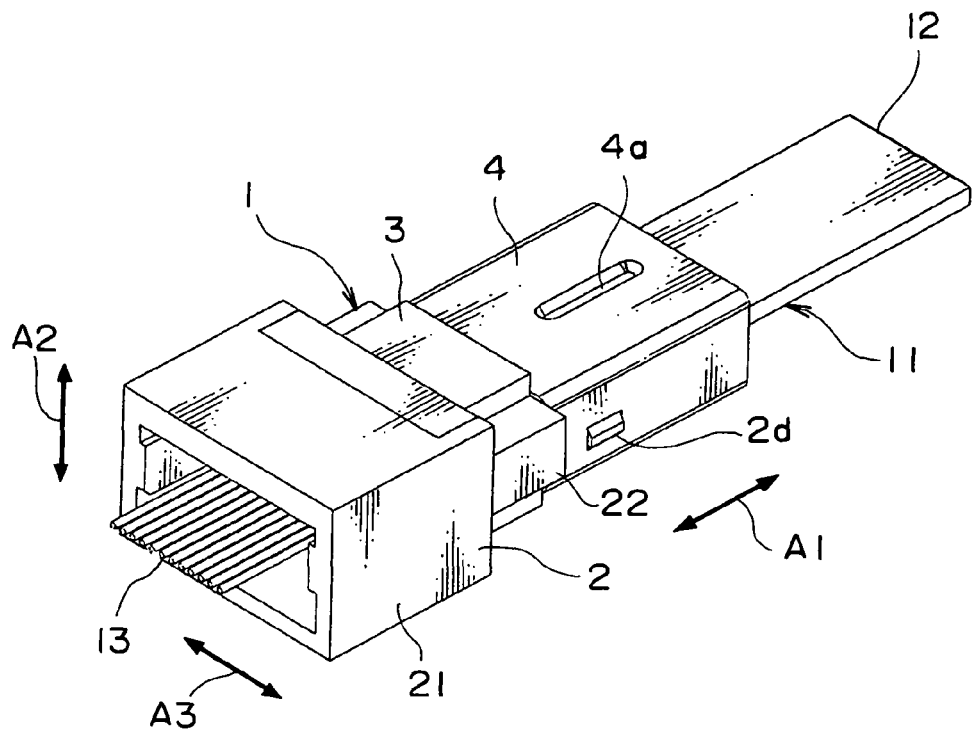
FIG. 1 is a perspective view of an optical connector according to an exemplary embodiment of the present invention in the state where the optical connector is connected to an optical cable.
Figure 2:
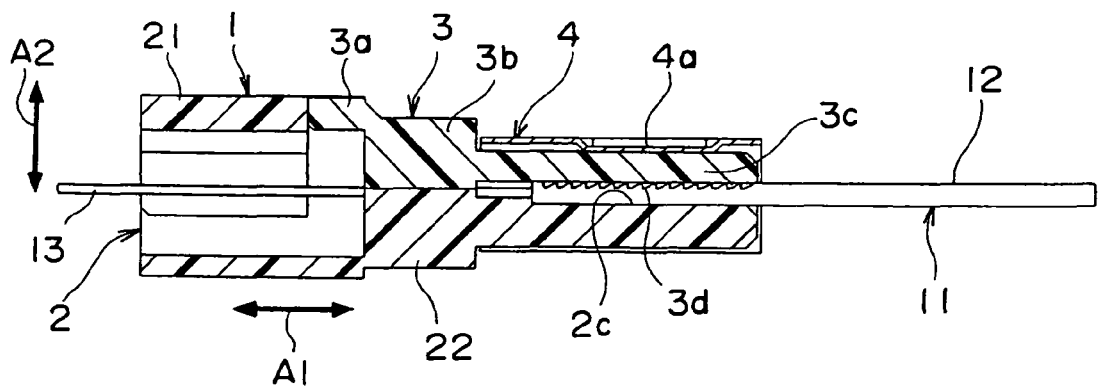
FIG. 2 is a sectional view of the optical connector illustrated in FIG. 1.

In FIGS. 1 and 2, an optical connector 1 is adapted to be connected to an optical cable 11 and comprises a base housing 2 made of plastic, a cover housing 3 made of plastic, and a metal clamp 4 fixing the cover housing 3 to the base housing 2.

The optical cable 11 has a plurality of optical fibers 13 covered with a coating member 12. At a longitudinal end of the optical cable 11, the coating member 12 is partly removed to expose the optical fibers 13. In the vicinity of the longitudinal end, the optical cable 11 is clamped between the base housing 2 and the cover housing 3. Herein, as the optical cable 11, use is made of a 12-core fiber comprising an array of the optical fibers 13 arranged at a 0.25 mm pitch.

The base housing 2 comprises a tubular fitting portion 21 formed at a front side in a first direction (that is, a back-and-forth direction) A1 and a fiber receiving portion 22 extending backward from a part of the fitting portion 21. In the fiber receiving portion 22, the optical cable 11 is received at a part in the vicinity of an end portion thereof. When the optical cable 11 is received in the fiber receiving portion 22, the optical fibers 13 of the optical cable 11 partly protrude forward through the fitting portion 21. The fitting portion 21 is adapted to be fitted to a mating connector (not shown) as an object to be connected.

When the mating connector is fitted to the fitting portion 21 of the optical connector 1 connected to the optical cable 11, optical fibers of an optical cable of the mating connector are faced to the optical fibers 13 of the optical cable 11 in an axial direction.

Thus, desired optical connection is obtained.

Figure 3:
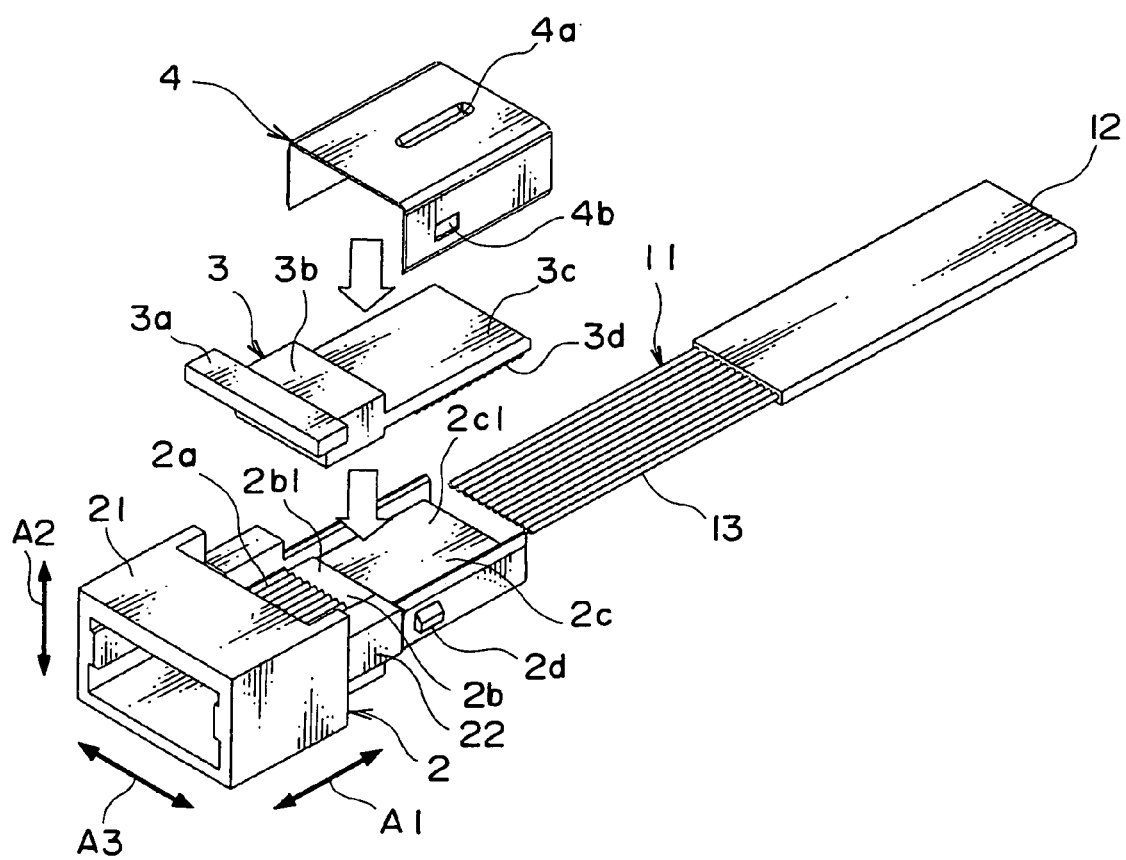
FIG. 3 is an exploded perspective view showing the optical connector illustrated in FIG. 1, together with the optical cable.

In FIG. 3, the fiber receiving portion 22 is provided with twelve grooves 2a each of which has a V-shaped section, a first recessed portion 2b, and a second recessed portion 2c which are continuously formed in this order from a position near the fitting portion 21. The grooves 2a are arranged in parallel to one another at a predetermined interval and extend in the back-and-forth direction A1. The grooves 2a are adapted to support the optical fibers 13. The first recessed portion 2b is adjacent to the grooves 2a in the back-and-forth direction A1. The second recessed portion 2c is adjacent to the first recessed portion 2b in the back-and-forth direction A1 and is lower in level than a bottom portion 2b1 of the first recessed portion 2b with a stepped portion formed therebetween. Herein, a bottom portion 2a1 of each groove 2a is flush with the bottom portion 2b1 of the first recessed portion 2b. However, a positional relationship between these bottom portions is not limited thereto.

Furthermore, the base housing 2 is provided with a pair of engaging projections 2d formed on opposite side surfaces of the second recessed portion 2c in a left-and-right direction A3.

The cover housing 3 is provided with a fitted portion 3a fitted to the base housing 2, a first coating portion 3b, and a second coating portion 3c, which are continuously formed in this order from the front side in the back-and-forth direction A1. The second coating portion 3c is smaller in thickness than the first coating portion 3b so that stepped portions are formed with respect to opposite surfaces of the first coating portion 3b in its thickness direction. In other words, in a second direction (that is, a vertical direction) A2 perpendicular to the back-and-forth direction A1, the second coating portion 3c is smaller in dimension than the first coating portion 3b so that the stepped portions are formed with respect to the opposite surfaces of the first coating portion 3b in the vertical direction A2.

The second coating portion 3c has a lower surface provided with a plurality of projecting portions 3d arranged in parallel to one another at a predetermined interval and extending in the third direction (that is, the left-and-right direction) A3 perpendicular to the back-and-forth direction A1 and the vertical direction A2. Each of the projecting portions 3d serves to hold the coating member 12 of the optical cable 11 in press contact when the optical cable 11 is connected to the optical connector 1. Since only the coating member 12 is held in press contact, each optical fiber 13 is not affected.

The clamp 4 has an inverted U shape in section and is formed around an axis extending in the back-and-forth direction A1. The clamp 4 is provided, at the center of an upper surface thereof, with a pressing portion 4a projecting inward and extending in the back-and-forth direction A1. The clamp 4 has opposite side surfaces provided with a pair of engaging holes 4b adapted to be removably engaged with the engaging projections 2d of the base housing 2.

Figure 4:
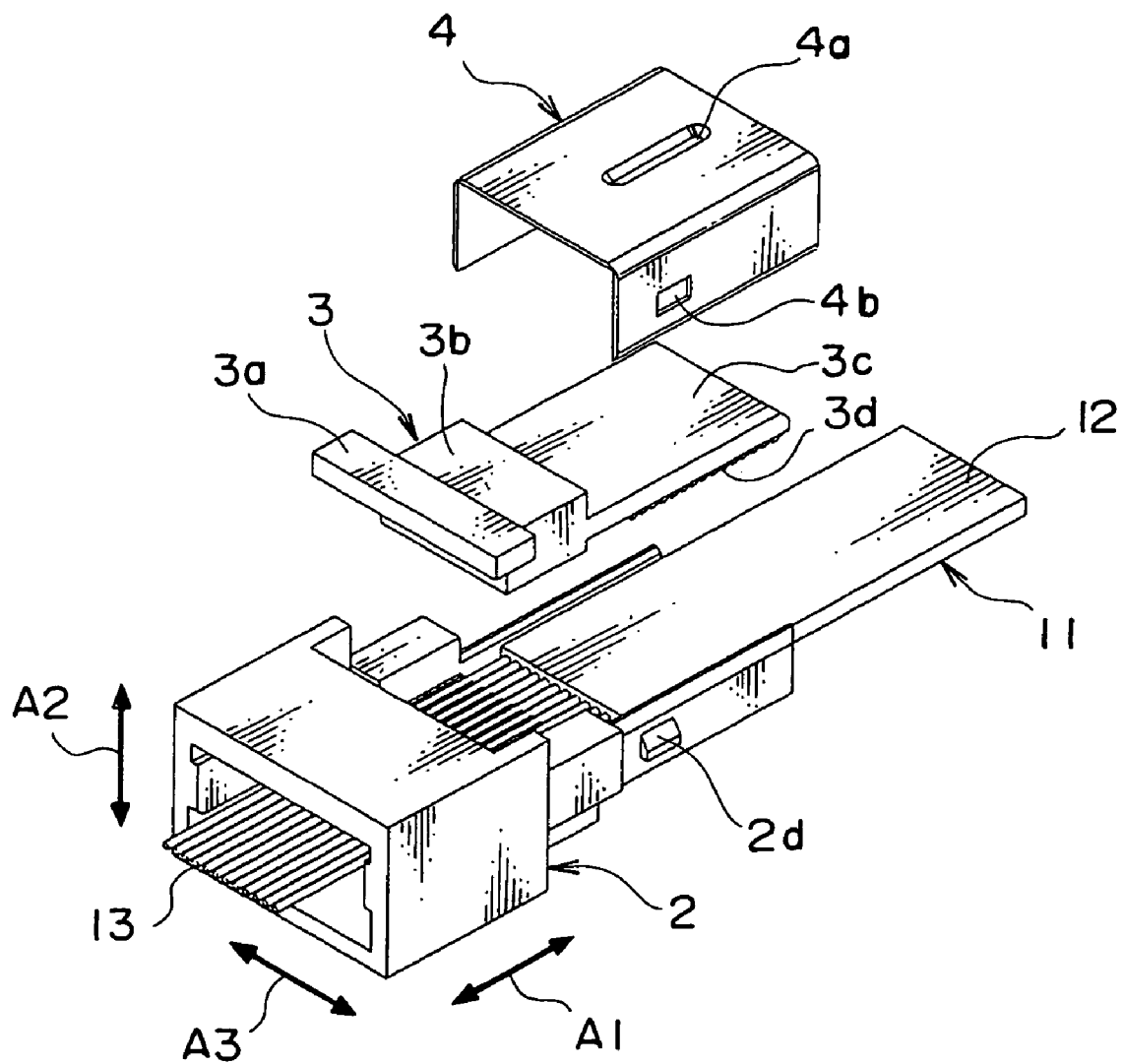
FIG. 4 is an exploded perspective view for describing a process of fixing the optical cable to the optical connector illustrated in FIG. 1.

The optical cable 11 is fixed to the optical connector 1 as follows. At first, as shown in FIG. 4, the coating member 12 is received in the second recessed portion 2c while the optical fibers 13 are received in the grooves 2a. Next, as depicted by white arrows in FIG. 3, the cover housing 3 is attached to the base housing 2 and then the clamp 4 is attached to the cover housing 3 and the base housing 2. The engaging holes 4b of the clamp 4 are engaged with the engaging projections 2d of the base housing 2 so that the cover housing 3 is fixed to the base housing 2.

At this time, the pressing portion 4a of the clamp 4 presses the second coating portion 3c of the cover housing 3 toward the base housing 2. Consequently, the first coating portion 3b of the cover housing 3 is faced to upper surfaces of the grooves 2a to position and hold the optical fibers 13 of the optical cable 11 in cooperation with the grooves 2a. The projecting portions 3d of the cover housing 3 are pressed against the coating member 12 of the optical cable 11 to be engaged with the coating member 12 so that the optical cable 11 is mechanically fixed to the optical connector 1. Specifically, the pressing portion 4a of the clamp 4 presses the second coating portion 3c of the cover housing 3 so that the projecting portions 3d of the cover housing 3 are press-contacted with the coating member 12 of the optical cable 11. Thus, the coating member 12 is reliably held, with partial or local deformation thereof, on a bottom portion 2c1 of the second recessed portion 2c of the base housing 2.

In the above-mentioned state, a space is formed between the grooves 2a and the second recessed portion 2c by the first recessed portion 2b. The space has a size slightly greater than a diameter of each optical fiber 13 in the second direction A2. Thus, a clearance is formed around each optical fiber 13. Therefore, each optical fiber 13 can be gently deformed in the first recessed portion 2b. Accordingly, it is possible to suppress a local bending stress caused in each optical fiber 13.

Herein, a plurality of projecting portions 3d are formed. However, even with a single projecting portion, it is possible to achieve a desired object.

Various exemplary embodiments of this invention will be enumerated in the following items 1-7.

1. An optical connector 1 adapted to be connected to an optical cable 11 having an optical fiber 13 and a coating member 12 covering the optical fiber 13, the optical connector 1 comprising:
   a base housing 2;
   a cover housing 3; and
   a clamp 4 fixing the cover housing 3 to the base housing 2,
   wherein the base housing 2 comprises:
   a groove 2a for positioning and holding the optical fiber 13 of the optical cable 11;
   a first recessed portion 2b continuously formed from the groove 2a; and a second recessed portion 2c continuously formed from the first recessed portion 2b,
   wherein the first and the second recessed portions 2b and 2c comprises bottom portions 2b1 and 2c1 different in level from each other to have a stepped portion formed therebetween,
   wherein the cover housing 3 comprises:
   a first coating portion 3b for covering the groove 2a; and
   a second coating portion 3c for covering the first and the second recessed portions 2b and 2c, and
   wherein the bottom portion 2c1 of the second recessed portion 2c and the second coating portion 3c presses the coating member 12 of the optical cable 11 to clamp the optical cable 11.

With the optical connector 1 according to item 1, it is possible to suppress the local bending stress caused in each optical fiber and to prevent the optical performance of the optical cable from being impaired. The optical cable is held by the clamp between the base housing and the cover housing in press contact so that the holding strength is maintained. The optical connector comprises the base housing, the cover housing, and the clamp. Thus, the optical connector requires a small number of parts and can easily be assembled.

2. The optical connector according to item 1, wherein the second coating portion 3c has at least one projecting portion 3d which is faced to the second recessed portion 2c and which extends in a direction perpendicular to an extending direction of the groove 2a.

3. The optical connector according to item 1 or 2, wherein the groove 2a extends in a first direction A1, the first recessed portion 2b being continuously formed from the groove 2a in the first direction A1, the second recessed portion 2c being continuously formed from the first recessed portion 2b in the first direction A1.

4. The optical connector according to item 3, wherein the groove 2a has a bottom portion 2a1 substantially flush with the bottom portion 2b1 of the first recessed portion 2b.

5. The optical connector according to item 3 or 4, wherein the bottom portion 2c1 of the second recessed portion 2c is shifted in position with respect to the bottom portion 2b1 of the first recessed portion 2b in a second direction A2 perpendicular to the first direction A1.

6. The optical connector according to one of items 1-5, wherein the second coating portion 3c is arranged in correspondence to the coating member 12 of the optical cable 11 and the clamp 4 is attached to the base housing 2 on an upper side thereof to press an upper surface of the second coating portion 3c.

7. The optical connector according to one of items 1-6, wherein the optical cable 11 comprises a plurality of optical fibers 13 and the optical connector 1 has a plurality of the grooves 2a in one-to-one correspondence to the optical fibers 13.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical connector adapted to be connected to an optical cable having an optical fiber and a coating member covering the optical fiber, the optical connector comprising:
    a base housing;
    a cover housing; and
    a clamp fixing the cover housing to the base housing,
    wherein the base housing comprises:
    a groove for positioning and holding the optical fiber of the optical cable;
    a first recessed portion continuously formed from the groove for receiving the optical fiber; and
    a second recessed portion continuously formed from the first recessed portion for receiving the coating member of the optical cable,
    wherein the first and the second recessed portions comprise bottom portions different in level from each other to have a stepped portion formed therebetween,
    wherein the groove has a bottom portion substantially flush with the bottom portion of the first recessed portion,
    wherein the cover housing comprises:
    a first coating portion for covering the groove; and
    a second coating portion for covering the first and the second recessed portions, and
    wherein the clamp is attached to the base housing and acts on the second coating portion so that the second coating portion cooperates with the first recessed portion to form a clearance around the optical fiber and cooperates with the bottom portion of the second recessed portion to clamp the optical cable therebetween with pressing the coating member.

2. The optical connector according to claim 1, wherein the second coating portion has at least one projecting portion which is faced to the second recessed portion and which extends in a direction perpendicular to an extending direction of the groove.

3. The optical connector according to claim 1, wherein the groove extends in a first direction, the first recessed portion being continuously formed from the groove in the first direction, the second recessed portion being continuously formed from the first recessed portion in the first direction.

4. The optical connector according to claim 3, wherein the bottom portion of the second recessed portion is shifted in position with respect to the bottom portion of the first recessed portion in a second direction perpendicular to the first direction.

5. The optical connector according to claim 1, wherein the optical cable comprises a plurality of optical fibers and the optical connector has a plurality of the grooves in one-to-one correspondence to the optical fibers.

6. The optical connector according to claim 1, wherein the second coating portion faces the bottom portion of the first recessed portion with a space which is left between the second coating portion and the bottom portion of the first recessed portion to produce the clearance.

7. The optical connector according to claim 6, wherein the space has a size greater than a diameter of the optical fiber in a direction perpendicular to an extending direction of the groove, whereby permitting a deformation of the optical fiber in the space.

* * * * *